(12) United States Patent
Hickman (10) Patent No.: US 7,371,030 B2
(45) Date of Patent: May 13, 2008

(54) FLEXIBLE ROAD SURFACES

(76) Inventor: Burleigh D. Hickman, 11303 Salado Springs Cir., Salado, TX (US) 76571-5064

( * ) Notice: Subject to any disclaimer, the term of this patent is extended or adjusted under 35 U.S.C. 154(b) by 0 days.

(21) Appl. No.: 11/520,103

(22) Filed: Sep. 13, 2006

(65) Prior Publication Data

US 2008/0063472 A1    Mar. 13, 2008

(51) Int. Cl.
*E01D 19/12* (2006.01)
*E01D 15/00* (2006.01)

(52) U.S. Cl. .................. 404/71; 404/1; 14/73; 290/1 R
(58) Field of Classification Search ............ 404/1, 404/71; 290/1 R; 14/73; 31/1, 71
See application file for complete search history.

(56) References Cited

U.S. PATENT DOCUMENTS

| | | | | |
|---|---|---|---|---|
| 1,916,873 A * | 7/1933 | Wiggins | ............... | 185/39 |
| 2,020,361 A | 11/1935 | Johnston | | |
| 3,944,855 A * | 3/1976 | Le Van | ............... | 310/69 |
| 4,212,598 A | 7/1980 | Roche et al. | ............... | 417/229 |
| 4,238,687 A * | 12/1980 | Martinez | ............... | 290/1 R |
| 4,239,974 A * | 12/1980 | Swander et al. | ............ | 290/1 R |
| 4,250,395 A | 2/1981 | Lundgren | .............. | 290/1 R |
| 4,418,542 A | 12/1983 | Ferrell | ............ | 60/668 |
| 4,614,875 A | 9/1986 | McGee | ............ | 290/1 R |
| 4,980,572 A * | 12/1990 | Sen | ............ | 290/1 R |
| 5,634,774 A * | 6/1997 | Angel et al. | ............ | 714/229 |
| 6,204,568 B1 | 3/2001 | Runner | ............ | 290/1 R |
| 6,362,534 B1 | 3/2002 | Kaufman | ............ | 290/1 R |
| 6,376,925 B1 | 4/2002 | Galich | ............ | 290/1 R |
| 6,734,575 B2 * | 5/2004 | Ricketts | ............ | 290/1 R |
| 6,767,161 B1 * | 7/2004 | Calvo et al. | ............ | 404/71 |
| 6,936,932 B2 | 8/2005 | Kenney | ............ | 290/1 R |
| 6,949,840 B2 | 9/2005 | Ricketts | ............ | 290/1 R |
| 6,969,213 B2 | 11/2005 | Rastegar et al. | ............ | 404/11 |
| 7,067,932 B1 * | 6/2006 | Ghassemi | ............ | 290/1 R |
| 2005/0089370 A1 * | 4/2005 | Painchaud | ............ | 404/71 |
| 2006/0029468 A1 * | 2/2006 | Rastegar et al. | ............ | 404/71 |
| 2007/0264081 A1 * | 11/2007 | Chiu | ............ | 404/71 |

* cited by examiner

*Primary Examiner*—Raymond W Addie
(74) *Attorney, Agent, or Firm*—Christopher Whewell (57) ABSTRACT

A construct from which a flexing road surface may be produced. A flexing road surface provided in accordance with the invention enables a vehicle to pass over the road surface relatively smoothly, while simultaneously imparting a reciprocating motion to the road surface. This reciprocating motion may be extracted at a takeoff point on the construct, and used as motive means for operating an electrical generator, air compressor, pump, or other useful mechanical device.

6 Claims, 10 Drawing Sheets

FLEXIBLE ROAD SURFACES

TECHNICAL FIELD

This invention relates generally to a mechanism which provides a pivoting motion. More particularly, it relates to a mechanism capable of providing a road surface with flexibility. The flexibility imparted to a road surface using a construct according to the invention can be employed to extract useful work from the motion of automobiles and other vehicles.

BACKGROUND

The movement of cars and other vehicles along streets and roads represents an immense yet heretofore generally untapped source of mechanical energy from which electricity or other work functions can be provided. Every revolution of the wheel of a vehicle results in a powerful thrust of force, generally directed toward the ground, which has heretofore been wasted, to the detriment of our planet's energy resources.

Other inventions have attempted to harness the energy of moving vehicles using treadle plates, pneumatic devices and complicated gearing mechanisms. Although these inventions capture some of the energy from passing vehicles and convert it into electricity, they generally stand in their ready state of operation as an obstacle protruding in the roadway. Since motorists are generally accustomed to traveling on smooth roads, it would be desirable to have at hand a device capable of generating useful work from the motion of motorized vehicles over roads and highways, which does not present an obstacle to drivers of a wide range of motor vehicle sizes and weights, and which also allows for smooth passage of vehicles over its surface during a process in which work may be extracted as a result of the vehicles' passage. Exemplary of the prior art in this fields are U.S. Pat. Nos. 2,020,361; 4,212,598; 4,250,395; 4,418,542; 4,614,875; 6,204,568; 6,362,534; 6,376,925; 6,767,161; 6,936,932; 6,949,840; and 6,969,213 each of which are herein incorporated by reference in their entirety.

SUMMARY OF THE INVENTION

In one embodiment, the present invention provides a flexible road surface adapted to receive and discharge motorized vehicles, and provide reciprocating mechanical energy in response thereto. A road surface according to such embodiment comprises a plurality of constructs, each of which constructs comprise: a first support arm having a first end portion, a second end portion, and a shank portion, wherein the first end portion comprises a first radial gear; and a second support arm having a first end portion, a second end portion, and a shank portion, wherein the second end portion of the second support arm comprises a second radial gear. The first radial gear and the second radial gear are disposed to be in meshing contact with one another, and the first support arm and the second support arm collectively comprise a first substantially-linear combination. There is also a third support arm having a first end portion, a second end portion, and a shank portion, and the first end portion of the third support arm comprises a third radial gear and the second end portion of the third support arm comprises a fourth radial gear; There is a fourth support arm having a first end portion, a second end portion, and a shank portion, and the second end portion of the fourth support arm comprises a fifth radial gear. There is also a fifth support arm having a first end portion, a second end portion, and a shank portion, and the second end portion of the fifth support arm comprises a sixth radial gear. The third radial gear and the fifth radial gear are disposed to be in meshing contact with one another, and the fourth radial gear and the sixth radial gear are disposed to be in meshing contact with one another. The third support arm, the fourth support arm, and the fifth support arm collectively comprise a second substantially-linear combination, with the first substantially-linear combination being disposed adjacent to the second substantially-linear combination. The first support arm and the fourth support arm are rigidly connected to one another at their shank portions, and the second support arm and the fifth support arm are rigidly connected to one another at a point along their shank portions. There is a first link arm, which is pivotally connected to the fourth support arm at the shank portion of the fourth support arm. The first link arm is also pivotally connected to the third support arm at the shank portion of the third support arm. There is a second link arm, which is rigidly connected to the third support arm at the shank portion of the third support arm. Finally, there is a third link arm, which is pivotally connected to the fifth support arm at the shank portion of the fifth support arm. The third link arm is pivotally connected to the third support arm at the shank portion of the third support arm. According to one embodiment of the invention, the first support arm and fourth support arm are comprised of singular construction, i.e., they are both embodied in the same piece or element. According to another embodiment of the invention, the second support arm and fifth support arm are of singular construction.

BRIEF DESCRIPTION OF THE DRAWINGS

In the annexed drawings.

DETAILED DESCRIPTION

Figure 1:
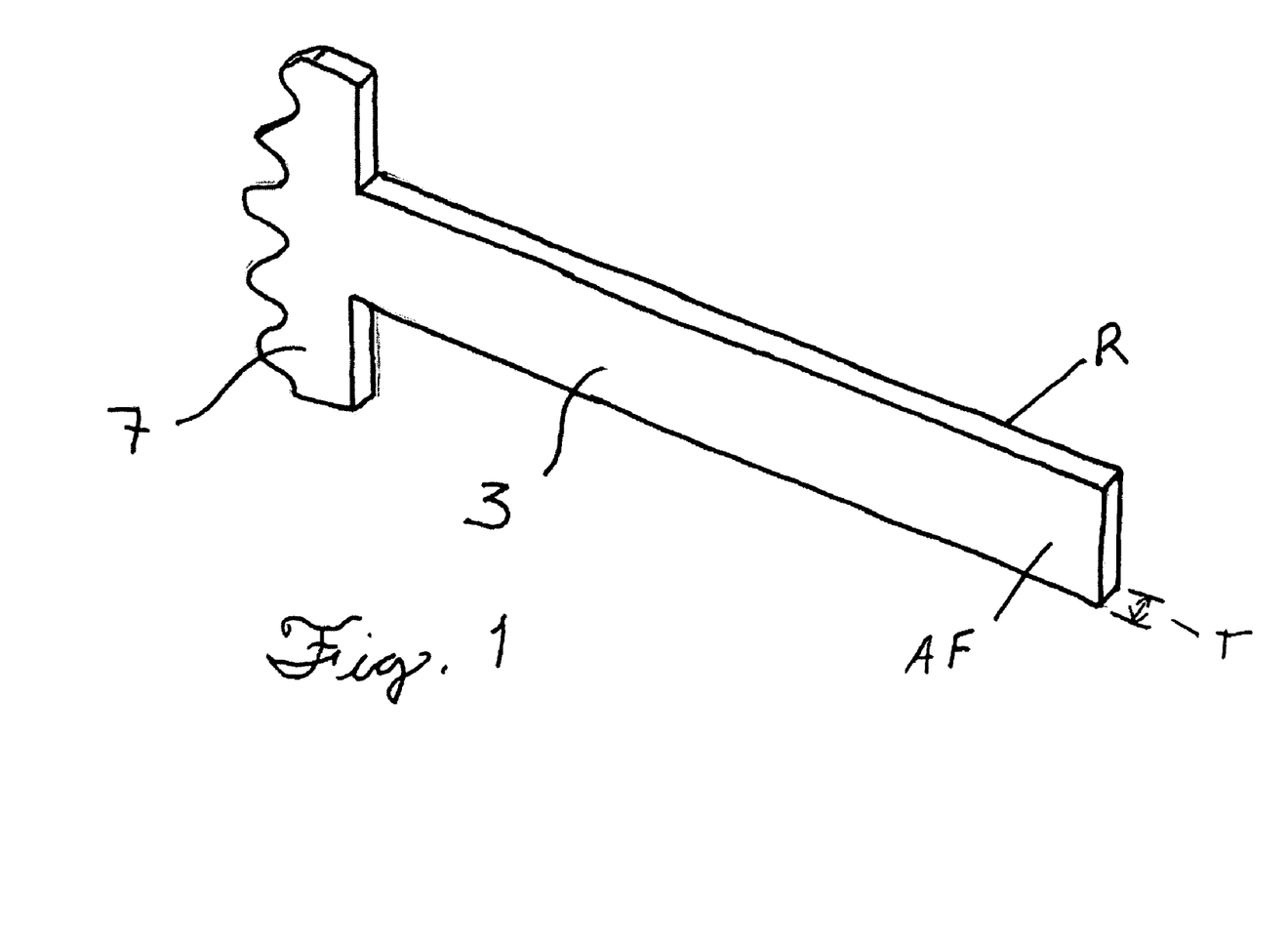
FIG. 1 shows a perspective view of a first configuration of a support arm having a radial gear on one of its ends, which is useful in constructing a device according to one form of the present invention.

Referring to the drawings and initially to FIG. 1 there is shown a perspective view of a first configuration of a support arm 3 having a first end portion and a second end portion, wherein the second end portion includes a radial gear 7 disposed thereon, which support arm 3 is useful in constructing a device according to one form of the present invention. The support arm 3, (and other support arms described in this specification), while shown in preferred embodiments as being substantially flat, may also comprise a shank portion disposed between its first and second end portions which is of any other cross-sectional configuration, including without limitation, circular, oval, triangular, rectangular, etc. The support arm 3 may be said to have a front face AF, a rear face R. and a thickness T.

Figure 2A:
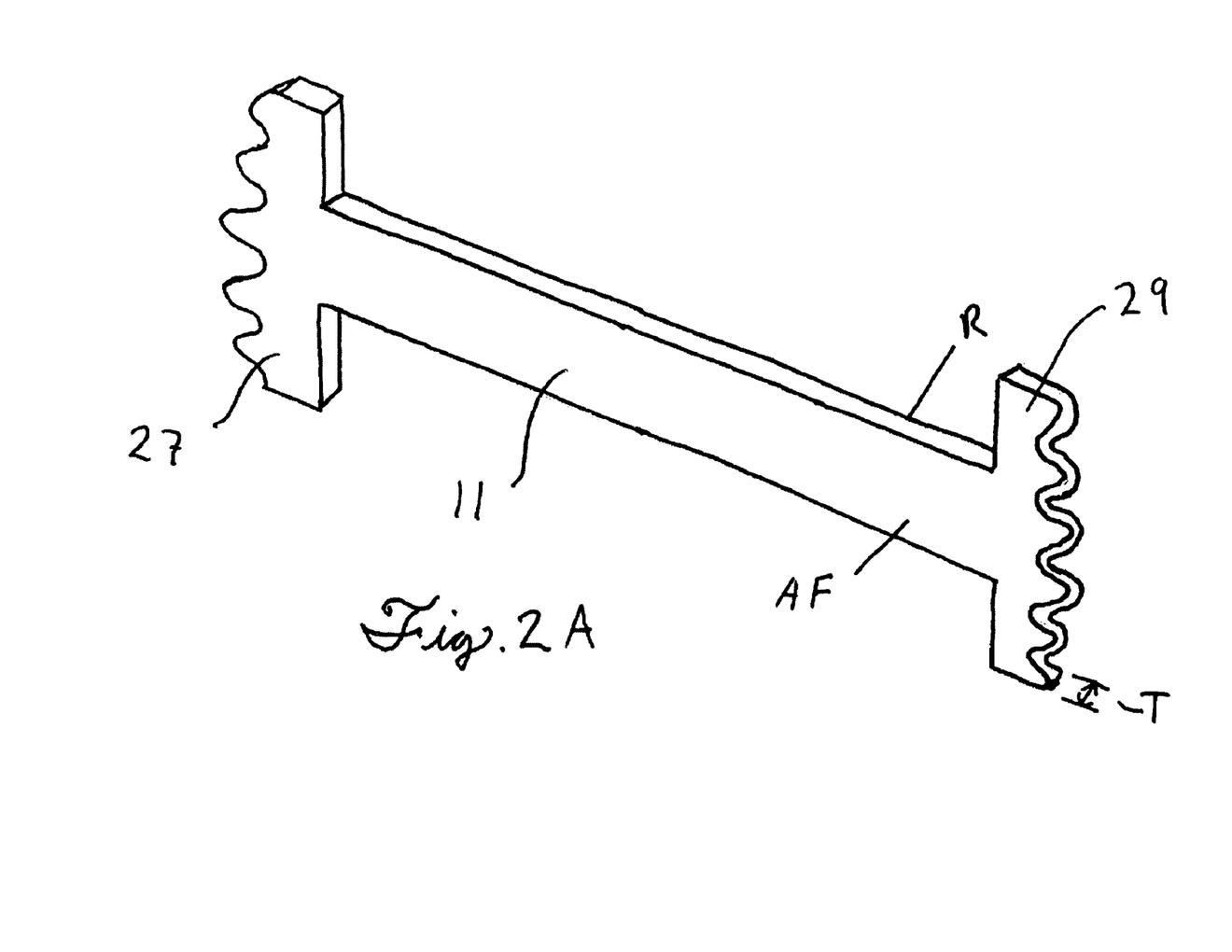
FIG. 2A shows a perspective view of a second configuration of a support arm having a radial gear on each of its ends, which is useful in constructing a device according to one form of the present invention.

In FIG. 2A there is shown a perspective view of a second configuration of a support arm 11 having radial gears 27, 29 disposed on each of its ends, which support arm 11 is useful in providing a combination according to the invention. The support arm 11 may be said to have a front face AF, a rear face R. and a thickness T.

Figure 2B:
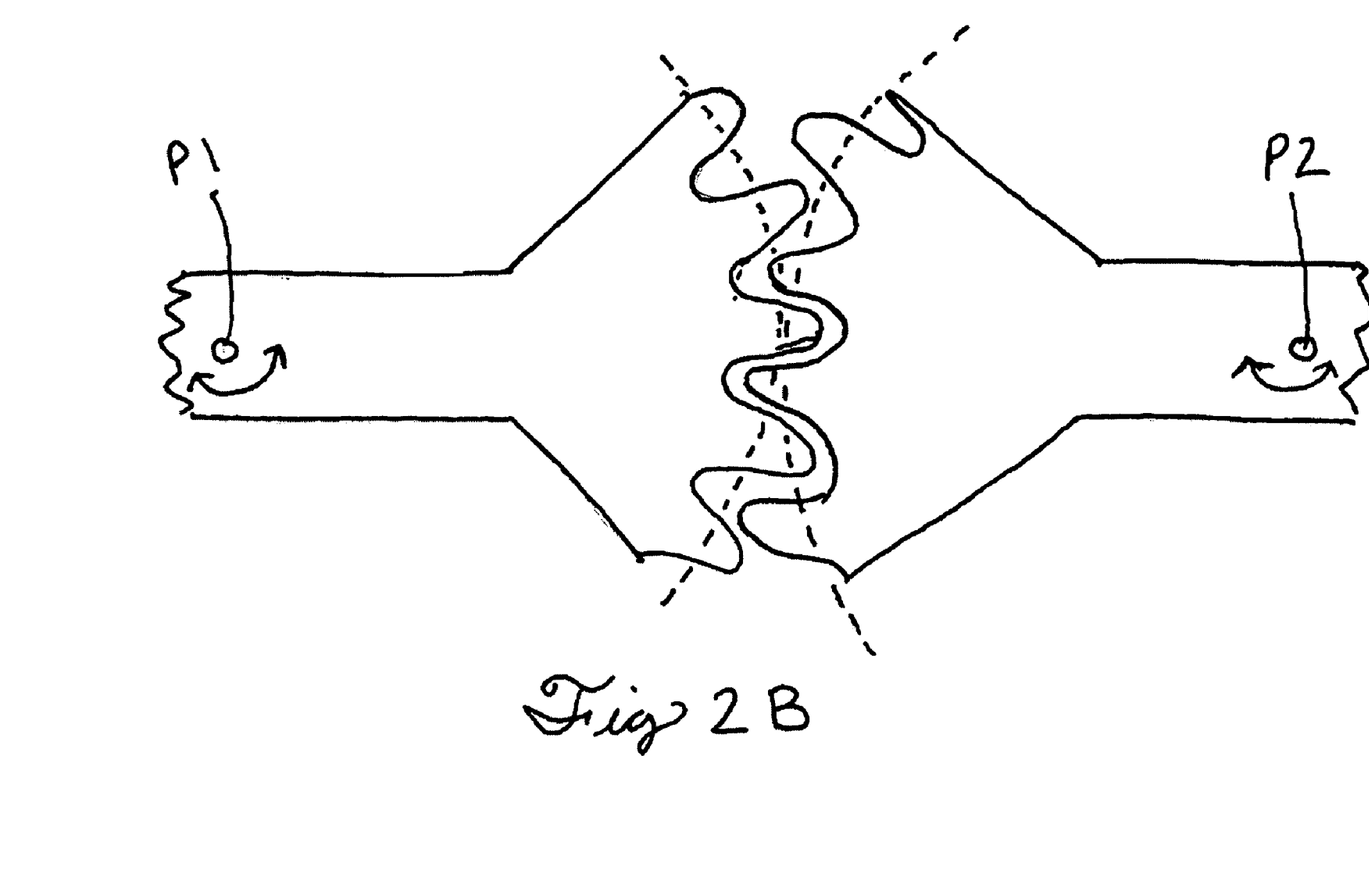
FIG. 2B shows a frontal view of the meshing of radial gears used in the present invention.

FIG. 2B shows a frontal view of the meshing of two radial gears of the type employed on the ends of the support arms according to a combination according to the present invention. Radial gears are so named because they comprise teeth which are disposed on an arc (dotted line) having a radius to its centerpoint. The meshing of radial gears provides up and down movement of portions of the support arms of which they are part, that reside beyond the pivot points P1 and P2, as will be appreciated after considering the contents of this specification.

Figure 3:
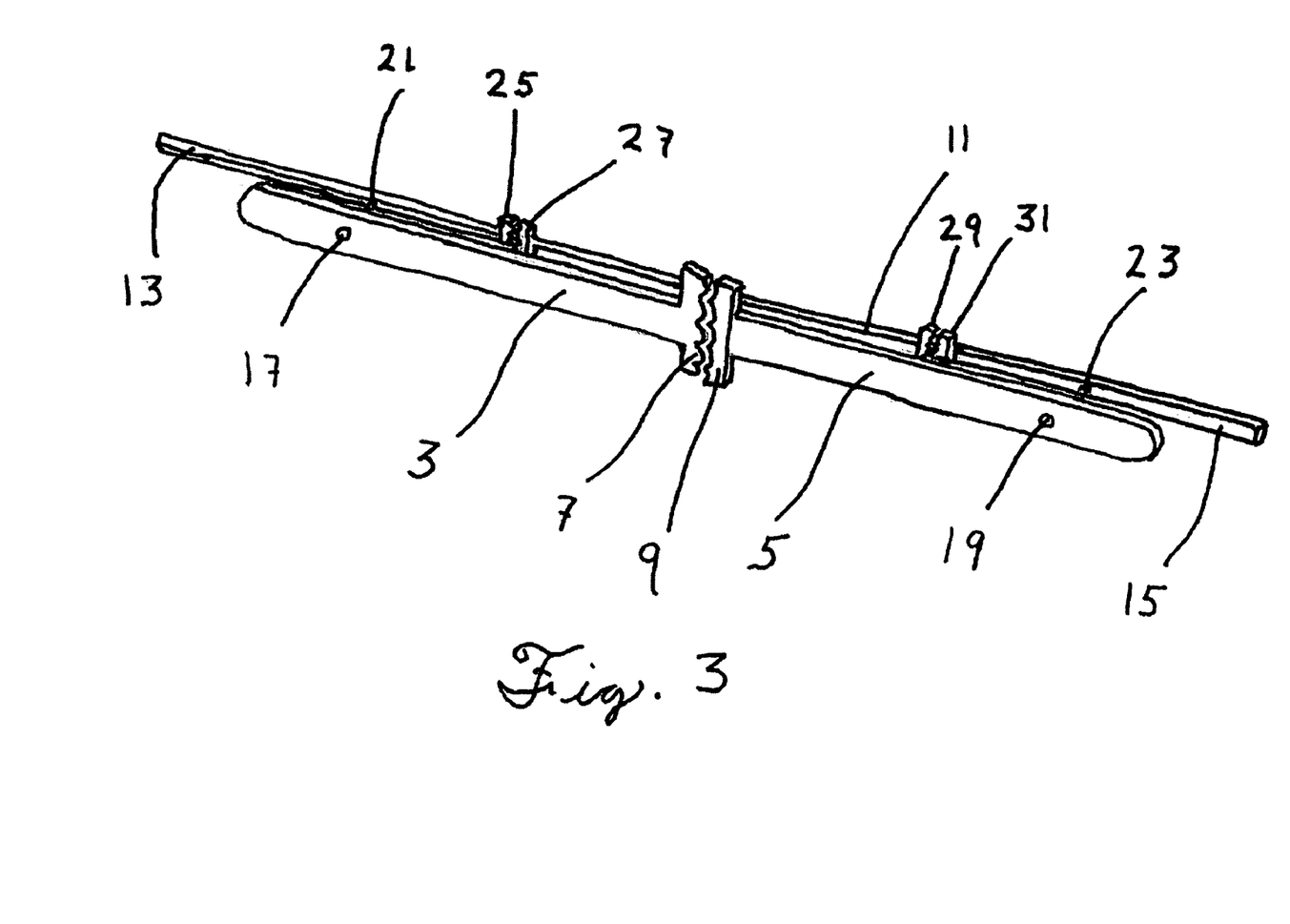
FIG. 3 shows a side perspective view of a subcombination useful in providing a device according to one embodiment of the invention.

FIG. 3 shows a side perspective view of an arrangement of elements useful in providing a subcombination useful in a device according to one embodiment of the invention. In FIG. 3 there is a first support arm 3, having a first end portion and a second end portion, which further comprises a first radial gear 7 disposed on its first end portion, and a connection point 17 along the length of its shank, which connection point 17 may comprise a hole disposed through the shank portion of the first support arm 3. There is also a second support arm 5, having a first end portion and a second end portion, which second support arm 5 further comprises a second radial gear 9 disposed on its first end portion, and a connection point 19 along the length of its shank, which connection point 19 may comprise a hole disposed through the shank portion of the second support arm 5. The first radial gear 7 disposed on the first support arm 3 is in meshing contact with the second radial gear 9 disposed on the first end portion of the second support arm 5. There is also a third support arm 11 having a first end portion, a second end portion, and a shank portion, wherein the first end portion and second end portion each comprise a third radial gear 27 and fourth radial gear 29 disposed thereon. There is a fourth support arm 13 having a first end portion, a second end portion, and a shank portion, which fourth support arm 13 includes a fifth radial gear 25 disposed thereon, wherein the fifth radial gear 25 is in meshing contact with the third radial gear 27 that is disposed on one of the end portions of the third support arm 11. The fourth support arm 13 further includes a hole 21 along its shank at a location which allows it to be rigidly attached to the first support arm 3 at hole 17, such as by means of a pin, weld, rivet, etc commonly disposed through the holes 17, 21. There is a fifth support arm 15 having a first end portion, a second end portion, and a shank portion, which fifth support arm 15 includes a sixth radial gear 31 disposed thereon, wherein the sixth radial gear 31 is in meshing contact with the fourth radial gear 29 that is disposed on one of the end portions of the third support arm 11. The fifth support arm 15 further includes a hole 23 along its shank at a location which allows it to be rigidly attached to the second support arm 5, at hole 19 such as by means of a pin, weld, rivet, etc commonly disposed through the holes 19, 23.

Figure 4:
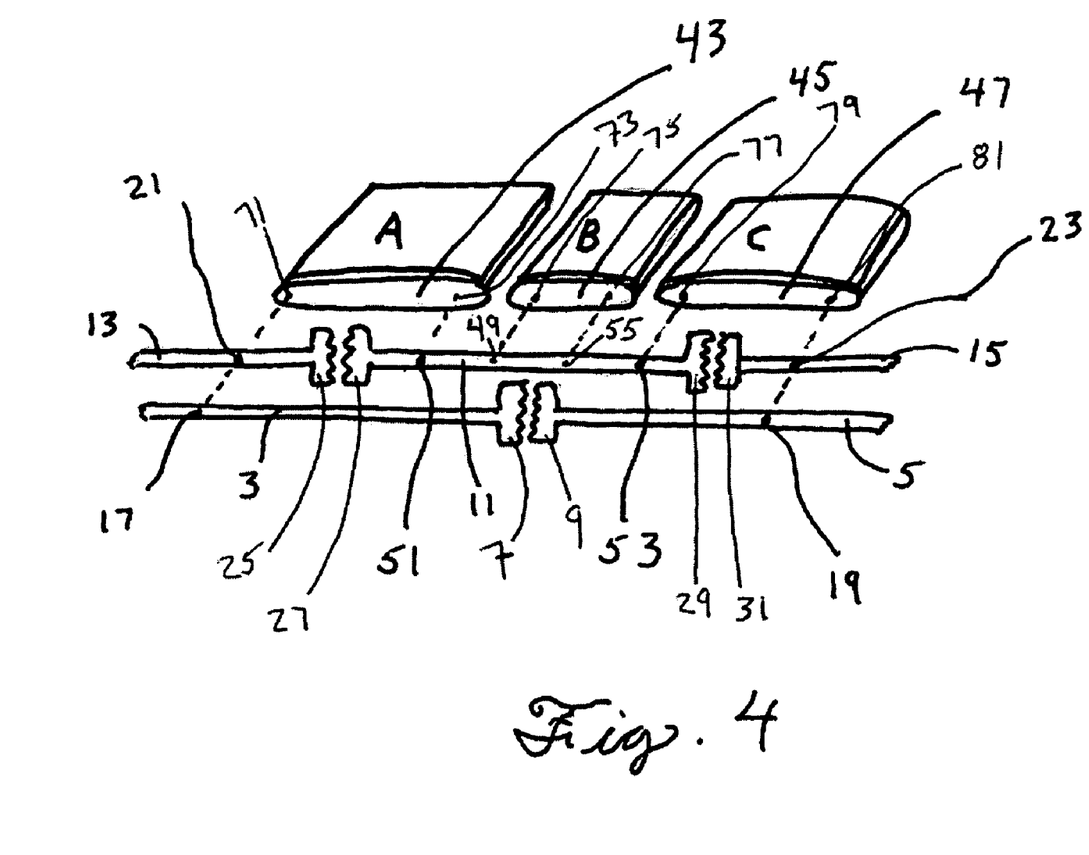
FIG. 4 shows an exploded perspective view of a subcombination useful in providing a device according to one embodiment of the invention.

FIG. 4 shows an exploded perspective view of a subcombination useful in providing a device according to one embodiment of the invention. In FIG. 4 there is a first support arm 3, having a first end portion and a second end portion, which further comprises a first radial gear 7 disposed on its first end portion, and a connection point 17 along the length of its shank, which connection point 17 may comprise a hole disposed through the shank portion of the first support arm 3. There is also a second support arm 5, having a first end portion and a second end portion, which second support arm 5 further comprises a second radial gear 9 disposed on its first end portion, and a connection point 19 along the length of its shank, which connection point 19 may comprise a hole disposed through the shank portion of the second support arm 5. The first radial gear 7 disposed on the first support arm 3 is in meshing contact with the second radial gear 9 disposed on the first end portion of the second support arm 5. There is also a third support arm 11 having a first end portion, a second end portion, and a shank portion, wherein the first end portion and second end portion each comprise a third radial gear 27 and fourth radial gear 29 disposed thereon. There is a fourth support arm 13 having a first end portion, a second end portion, and a shank portion, which fourth support arm 13 includes a fifth radial gear 25 disposed thereon, wherein the fifth radial gear 25 is in meshing contact with the third radial gear 27 that is disposed on one of the end portions of the third support arm 11. The fourth support arm 13 further includes a hole 21 along its shank at a location which allows it to be attached to the hole 17 in the first support arm 3, such as by means of a pin, rivet, etc commonly disposed through the holes 17, 21. There is a fifth support arm 15 having a first end portion, a second end portion, and a shank portion, which fifth support arm 15 includes a sixth radial gear 31 disposed thereon, wherein the sixth radial gear 31 is in meshing contact with the fourth radial gear 29 that is disposed on one of the end portions of the third support arm 11. The fifth support arm 15 further includes a hole 23 along its shank at a location which allows it to be attached to the hole 19 in the second support arm 5, such as by means of a pin, rivet, etc commonly disposed through the holes 19, 23.

FIG. 4 further shows holes 49, 51, 53, 55 disposed through the third support arm, which are useful in attachment of the first link arm 43, second link arm 45, and third link arm 47 to the remaining elements of the construct, as were also depicted in FIG. 3. The first link arm 43, second link arm 45, and third link arm 47 are preferably comprised of flat pieces of metal in the general shape as shown. The first link arm 43 comprises holes 71 and 73 disposed through it, the second link arm 45 comprises holes 75, 77 disposed through it, and the third link arm 47 comprises holes 79, 81 through it. Thus, each of the link arms comprise holes near their end portions.

In a final construct according to one embodiment of the invention, the holes 21, and 71 are pivotally connected to one another by means of a pin, rivet, or other conventional fastening means. The hole 73 on the first link arm 43 is similarly pivotally connected to the hole 51 in the third support arm 11. The holes 75, 77 on the second link arm 45 are rigidly connected to the holes 49, 55, respectively on the third support arm 11. The hole 79 on the third link arm 47 is pivotally connected to the hole 53 in the third support arm 11, and the holes 23, and 81 are pivotally connected to one another by conventional means as described above. Thus, in preferred embodiments of the invention, the first link arm 43 is hingeably or pivotally attached to the third support arm 11 and the fourth support arm 13, and the third link arm 47 is hingeably or pivotally attached to the third support arm 11 and the fifth support arm 15.

FIG. 4 also shows road surfaces A, B, C. These road surfaces comprise a top surface, on which a vehicle such as an automobile or truck may reside. These road surfaces also include a side edge portion to which each of the first link arm 43, second link arm 45, and third link arm 47 are attached by conventional means. In one preferred embodiment, the road surfaces A, B, C comprise rods of steel or other rigid support material passing beneath them in a direction parallel to the alignment of the holes 17, 21, 71. In one embodiment, the ends of such rods can be a common means for attachment of the holes 17, 21, 71. Thus, the ends of such support rods may be commonly disposed through holes 17, 21, 71; holes 51, 73; holes 49, 75; holes 77,55; holes 79,53; and holes 81, 23, 19. When used, such rods provide support to the road surface and serve the dual function of providing either a pivotal or rigid connection between the elements of a combination according to the invention. In FIG. 4, and other figures, for clarity there is a space between the radial gear elements. In a combination of the invention, the radial gears are all in meshing contact with one another.

The elements and their arrangement just described in connection with FIG. 4 is also employed on the opposite side of the road surfaces A, B, C than was shown in FIG. 4, as is clear from considering FIG. 6 and FIG. 7 to provide one portion of a flexible road surface, as will be later described.

Figure 5A:
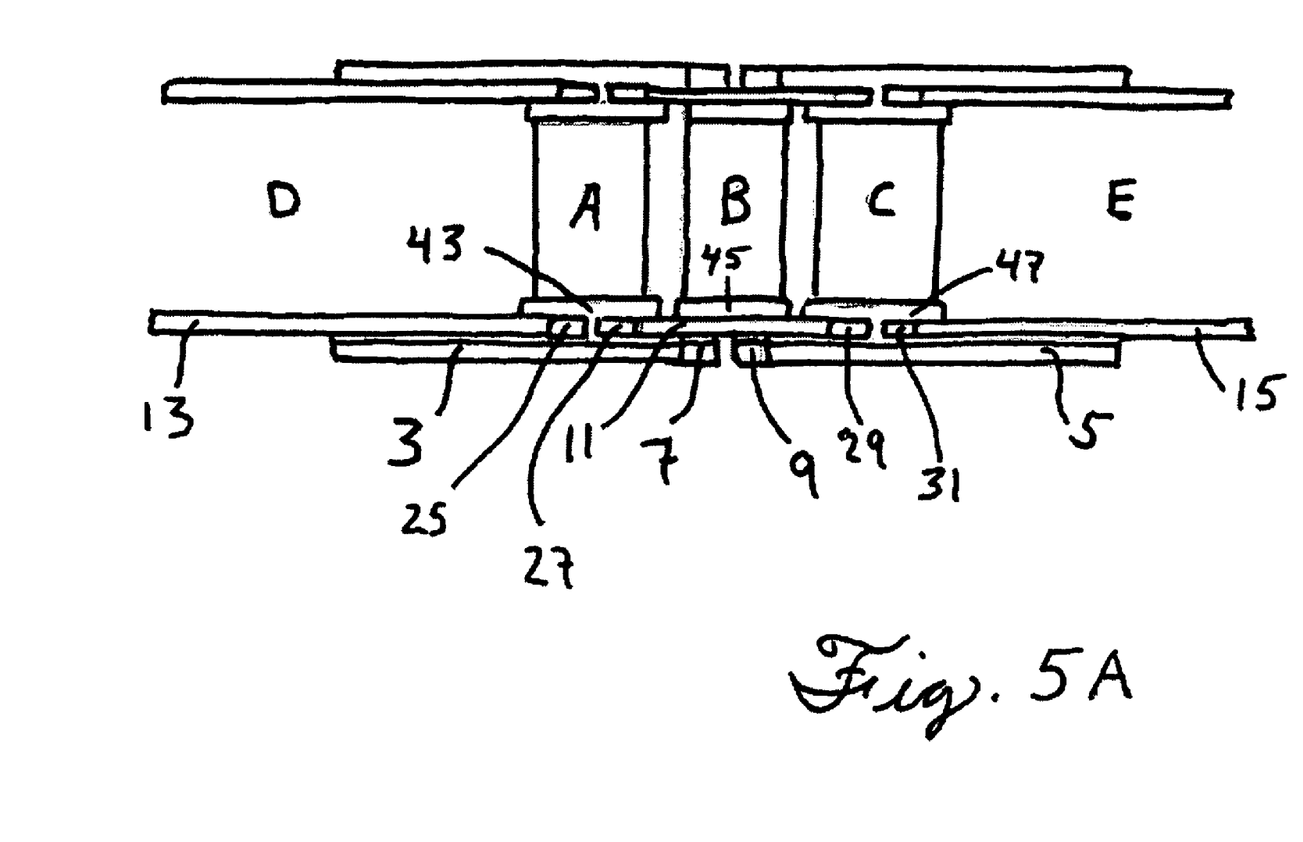
FIG. 5A shows an overhead perspective view of a subcombination useful in providing a device according to one embodiment of the invention.

FIG. 5A shows an overhead perspective view of a such a subcombination useful in providing a combination according to one embodiment of the invention. Here are shown the respective locations of the first support arm 3, first radial gear 7, second support arm 5, second radial gear 9, third support arm 11, third radial gear 27, fourth radial gear 29, fourth support arm 13, fifth radial gear 25, fifth support arm 15, sixth radial gear 31, first link arm 43, second link arm 45, third link arm 47, and road surfaces A, B, C. Also shown are the respective locations of road surfaces D, E, from FIG. 6 and FIG. 7. In FIG. 5A, for clarity there is a space between the various radial gear elements. In a combination of the invention, the radial gears are all in meshing contact with one another.

Figure 5B:
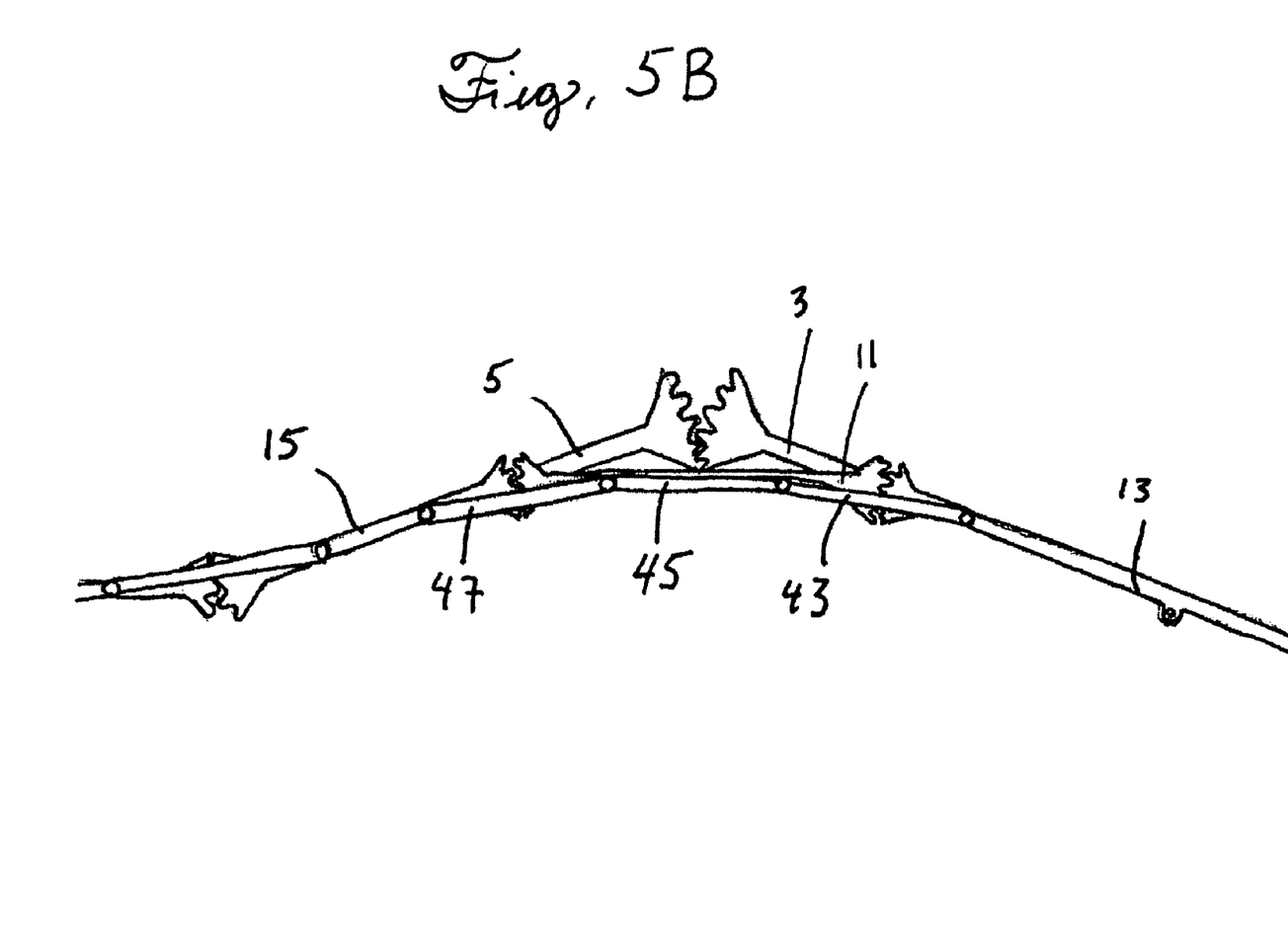
FIG. 5B shows an alternate side perspective view of various elements of a combination according to one embodiment of the invention.

FIG. 5B shows a side perspective view of various elements of a combination according to one embodiment of the invention as viewed from the perspective of the opposite sides of the road surfaces shown in FIG. 4. Stated another way, the view in FIG. 5B is of the other side of the elements shown in FIG. 4, and wherein some of the elements shown in FIG. 4 are connected to one another. Thus, the respective locations of the first support arm 3, second support arm 5, third support arm 11, fourth support arm 13, fifth support arm 15, first link arm 43, second link arm 45, and third link arm 47 are shown in their cooperative connection.

Figure 6:
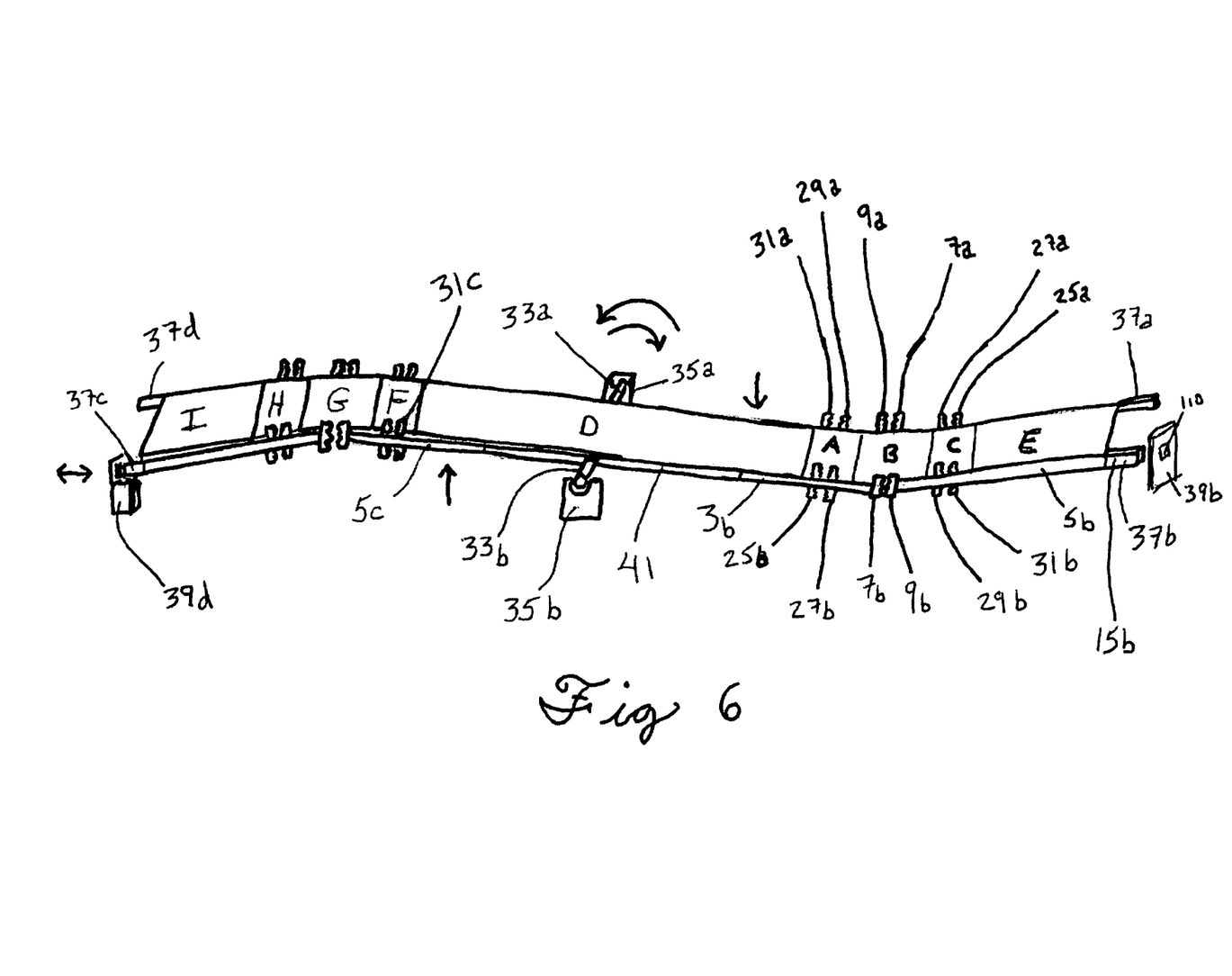
FIG. 6 shows a perspective view of a flexible surface provided according to the invention in a first disposition.

FIG. 6 shows a perspective view of a flexible surface provided according to the invention in a first disposition. In this FIG. 6 is provided a flexible road surface in accordance with the invention, which employs four of the arrangements described in FIG. 4, in two different flex areas on the road surface. The first flex area comprises road surfaces A, B, C, and the second flex area comprises road surfaces F, G, H. In this embodiment, the fourth support arm 13 is replaced by long link 41, which is identical to support arm 13, with the exception that it is longer and long link 41 also includes a radial gear disposed on each of its two end portions, with the first radial gear being 25*b*, and the second radial gear being 31*c*. Long link 41 abuts and is connected to the side of the road surface D. In such a configuration, long link 41 simultaneously serves as the fourth support arm (analogous to 13) for the assembly at road surfaces A, B, C and also as the fifth support arm (analogous to 15) for the assembly disposed at road surfaces F, G, H. Stated another way, in one embodiment of the invention the mechanisms at road surfaces A, B, C are a mirror image of the mechanisms at road surfaces F, G, H with respect to a mirror disposed at the centerpoint of the road surface D, perpendicularly to the longest length dimension of the flexible road shown in FIG. 6.

The remaining arrangements are as heretofore described, and the elements and their combinations are also symmetrical with respect to a mirror line drawn along the center of the flexible road, along its length dimension. Thus, a road surface according to FIG. 6 includes four separate constructs as substantially described in FIG. 4, with the subscript letters a, b, c, d being used in reference to the elements associated with each of such four subcombinations. A flexible road surface according to one embodiment the invention comprises a plurality of such constructs. Although shown and described where a flexible road according to the invention comprises four of such constructs, it is within the scope of the present invention to provide flexible roads which include more than four such constructs.

There is a first pivot arm 33*a* that is rigidly attached to the longest road surface D substantially at its midpoint, which pivot arm 33*a* is disposed in a bearing 35*a* that resides on the ground or other stationary structure. In combination with a second pivot arm 33*b* that is rigidly attached to the road surface D substantially at its midpoint on the opposite side of the road from 33*a*, which pivot arm 33*b* is disposed in a bearing 35*b* that resides on the ground or other stationary structure, these two pivot arms 33*a* and 33*b* provide for the up and down movement of the road surface D in a teeter-totter fashion, as shown by the up and down arrows, in response to the weight of a vehicle passing across the road surface D. as shown by the arrows in the form of an arc.

The support arm 5*b* is attached to the support arm 15*b* as earlier described, and the end portion 37*b* of the support arm 15*b* is preferably hinged, in the fashion as is a connecting rod which is attached to a piston in a conventional combustion engine, and fitted into a slot 110 in a bearing 39*b* to enable the end portion 37*b* of the support arm 15*b* to slide in and out of the slot 110 when the road surface moves in an up and down cycle as a vehicle passes over it. Each of the end portions of the support arms analogous to 37*b* at the four corners of the construct are similarly provided with bearings in which they can slide, in and out of, including 37*a*, 37*c*, and 37*d*. Although bearings 39*b* and 39*d* are the only ones shown, identical provisions exist at the remaining two end portions of the support arms 37*a* and 37*c*.

Thus, the respective locations of the support arm 3*b*, radial gear 25*b*, radial gear 27*b*, radial gear 7*b*, radial gear 9*b*, radial gear 29*b*, and radial gear 31*b* are shown. Also shown are the respective locations of the support arms 3*b*, 5*b*, and 15*b*. Also shown are the respective locations of the radial gear 25*a*, radial gear 27*a*, radial gear 7*a*, radial gear 9*a*, radial gear 29*a*, and radial gear 31*a*.

An inherent feature of a road surface made in accordance with a preferred embodiment of the invention shown in FIG. 6 is that whatever the change in the angles which road surfaces I, D, E make with respect to the horizontal as a vehicle passes across the road surface, the angles which the road surfaces H, F, A, C make with respect to the horizontal will simultaneously be changed in an amount of ½ of the change of the angles made by road surfaces I, D, E with respect to the horizontal. In addition, road surfaces B and G are always substantially parallel to the horizontal and only undergo vertical motion.

Figure 7:
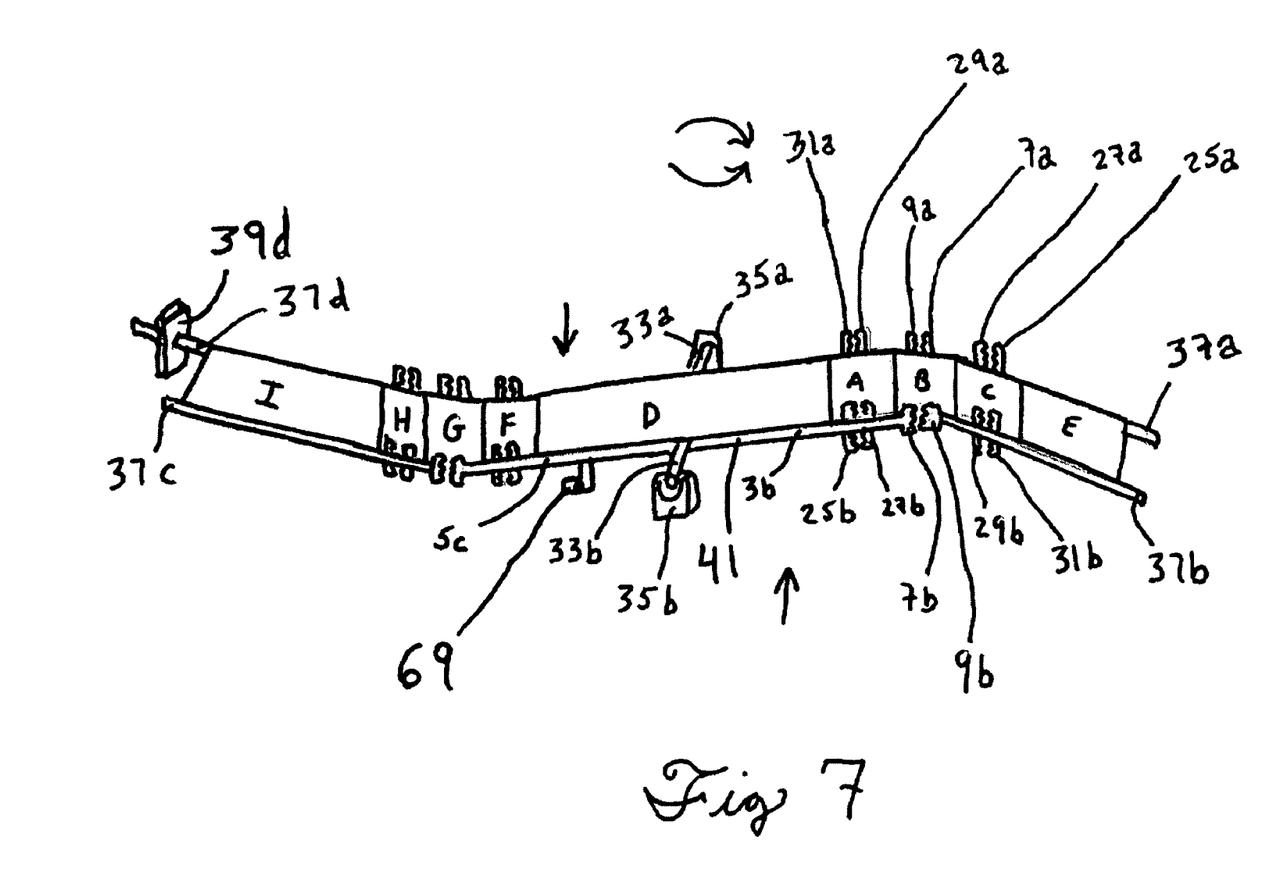
FIG. 7 shows a perspective view of a flexible surface provided according to the invention in a second disposition.

FIG. 7 shows a perspective view of a flexible surface provided according to the invention in a second disposition. This is the same construct as shown in FIG. 6, except the road surface D is now oriented differently. Thus, all of the afore-described elements are identical to that of FIG. 6, with the addition of element 69 which is a takeoff point from which mechanical energy may be obtained. As the road surface D is caused to move up and down under the influence of a vehicle passing over its surface, the takeoff point 69 moves up and down with it. By connecting a mechanical device to takeoff point 69, such as an electrical generator, by means of a cam, it is possible to use a construct according to the invention to generate electricity as vehicles pass over the flexible road surface. The takeoff point is simply a connection point. It may be a boss into which a bolt is housed which is connected to a lever, etc., as means for generating electricity from a reciprocating motion are well-known in the art.

Figure 8:
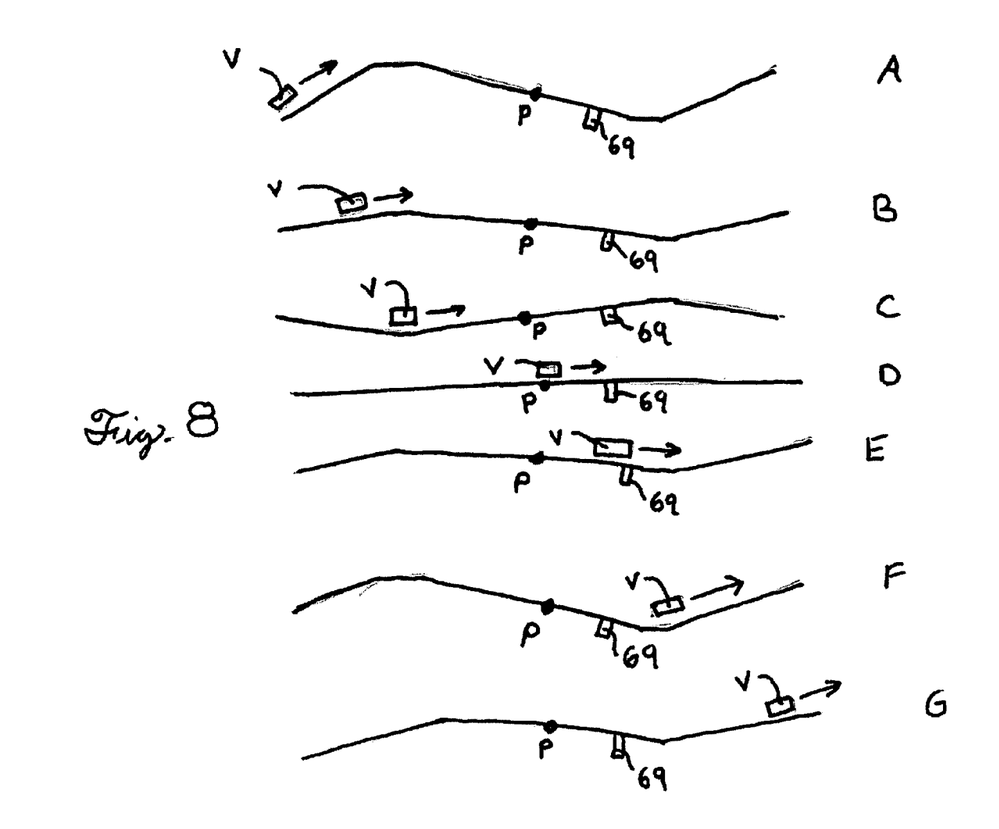
FIG. 8 shows a side perspective view of a plurality of dispositions of a flexible surface provided according to the invention as they vary with time as a vehicle passes.

FIG. 8 shows a side perspective view of a plurality of dispositions of a flexible surface provided according to the invention as they vary with time as a vehicle V passes. In FIG. 8A, the vehicle approaches from the left. As it reaches the first hump in the road, in FIG. 8B the road surface is forced down, which causes the longest road surface to pivot about point P at which the pivot arms 33a and 33b are disposed on each side of the road. This also causes the takeoff point 69 to move upwards. By the time we arrive at FIG. 8C, the longest road surface is at a low point where the vehicle is, due to gravity acting on the vehicle, thus further moving the takeoff point 69 in an upward direction. When the vehicle reaches the pivot point P as in FIG. 8D, the road surface is substantially flat, and as the vehicle progresses the longest road surface begins to move downwards, as in FIG. 8E, causing the takeoff point 69 to also be lowered. At FIG. 8F, the vehicle has caused the longest road surface to reach its other extreme of movement and when the vehicle exits the flexible road according to the invention as in FIG. 8G, the road surface is seen to once again be leveling out. In this fashion, by the forces of gravity, it is possible to extract essentially free mechanical energy from passing traffic, which free mechanical energy can be used to do useful work, such as pumping water from a well, creating compressed air, or generating electricity.

As mentioned, the takeoff point 69 may be disposed essentially at any position along the road surface shown in FIG. 6, including also at the end portions 37a, 37b, 37c, 37d. In addition, since the pivot arms 33a and 33b undergo cyclical reciprocating rotational motion. It is also possible to remove motive energy from a road surface in accordance with the invention by taking advantage of the rotational torque on these pivot arms 33a and 33b using any means well-known in the art.

According to alternate forms of the invention, adjacent elements of pairs of the various road surfaces A, B; B, C; C, E, etc. include links to one another. Thus, A, B may be hingeably attached to one another along their adjacent edge portions; B, C may be hingeably attached to one another along their adjacent edge portions; C, E may be hingeably attached to one another along their adjacent edge portions, etc. The means for connection of such pairs may be any hingeable linkage known in the art, including without limitation common hinging means as are found on doors, and including connection means used on the track portions of tracked vehicles, such as military tanks. Such provisions add significant strength to a road surface made in accordance with the invention.

While the use of radial gears have been mentioned in this specification, the present invention shall be understood to also include the use of radial-like gears, which are radial gears that differ slightly from having a perfect arc radius, either more concave or more convex than a perfectly arcuate radial gear, provided that the essential functions as herein described are nevertheless achievable using such an equivalent structure. Thus, one embodiment of the invention employs a liberal definition of radial gears as used and understood herein, to also include gears functioning in the ways described herein and having curved surfaces which either are, or very closely approximate, a perfect radial gear.

Consideration must be given to the fact that although this invention has been described and disclosed in relation to certain preferred embodiments, obvious equivalent modifications and alterations thereof will become apparent to one of ordinary skill in this art upon reading and understanding this specification and the claims appended hereto. This includes subject matter defined by any combination of any one of the various claims appended hereto with any one or more of the remaining claims, including the incorporation of the features and/or limitations of any dependent claim, singly or in combination with features and/or limitations of any one or more of the other dependent claims, with features and/or limitations of any one or more of the independent claims, with the remaining dependent claims in their original text being read and applied to any independent claims so modified. This also includes combination of the features and/or limitations of one or more of the independent claims with features and/or limitations of another independent claims to arrive at a modified independent claim, with the remaining dependent claims in their original text being read and applied to any independent claim so modified. Accordingly, the presently disclosed invention is intended to cover all such modifications and alterations, and is limited only by the scope of the claims which follow.

I claim:

1. A construct useful in providing a flexible road surface, which comprises:
   a) a first support arm having a first end portion, a second end portion, and a shank portion, wherein said first end portion comprises a first radial gear;
   b) a second support arm having a first end portion, a second end portion, and a shank portion, wherein said second end portion of said second support arm comprises a second radial gear,
   said first radial gear and said second radial gear being disposed to be in meshing contact with one another, wherein said first support arm and said second support arm collectively comprise a first substantially-linear combination,
   c) a third support arm having a first end portion, a second end portion, and a shank portion, wherein said first end portion of said third support arm comprises a third radial gear and wherein said second end portion of said third support arm comprises a fourth radial gear;
   d) a fourth support arm having a first end portion, a second end portion, and a shank portion, wherein said second end portion of said fourth support arm comprises a fifth radial gear, e) a fifth support arm having a first end portion, a second end portion, and a shank portion, wherein said second end portion of said fifth support arm comprises a sixth radial gear, wherein said third radial gear and said fifth radial gear are disposed to be in meshing contact with one another, and wherein said fourth radial gear and said sixth radial gear are disposed to be in meshing contact with one another, wherein said third support arm, said fourth support arm, and said fifth support arm collectively comprise a second substantially-linear combination, said first substantially-linear combination being disposed adjacent to said second substantially-linear combination, and wherein said first support arm and said fourth support arm are rigidly connected to one another at their shank portions, and wherein said second support arm and said fifth support arm are rigidly connected to one another at a point along their shank portions,  f) a first link arm, wherein said first link arm is pivotally connected to said fourth support arm at the shank portion of said fourth support arm, and wherein said first link arm is pivotally connected to said third support arm at the shank portion of said third support  g) a second link arm, wherein said second link arm is rigidly connected to said third support arm at the shank portion of said third support arm; and  h) a third link arm, wherein said third link arm is pivotally connected to said fifth support arm at the shank portion of said fifth support arm, and wherein said third link arm is pivotally connected to said third support arm at the shank portion of said third support arm.

2. A construct according to claim 1 and further comprising i) a first road surface including a side edge portion, said first road surface being attached to said first link arm.

3. A construct according to claim 2 and further comprising: j) a second road surface including a side edge portion, said second road surface being attached to said second link arm.

4. A construct according to claim 3 and further comprising: k) a third road surface including a side edge portion, said third road surface being attached to said third link arm.

5. A flexible road surface adapted to receive and discharge motorized vehicles and provide reciprocating mechanical motion in response thereto, which comprises a plurality of constructs, each of which constructs comprise:

a) a first support arm having a first end portion, a second end portion, and a shank portion, wherein said first end portion comprises a first radial gear;

b) a second support arm having a first end portion, a second end portion, and a shank portion, wherein said second end portion of said second support arm comprises a second radial gear, said first radial gear and said second radial gear being disposed to be in meshing contact with one another, wherein said first support arm and said second support arm collectively comprise a first substantially-linear combination,  c) a third support arm having a first end portion, a second end portion, and a shank portion, wherein said first end portion of said third support arm comprises a third radial gear and wherein said second end portion of said third support arm comprises a fourth radial gear;

d) a fourth support arm having a first end portion, a second end portion, and a shank portion, wherein said second end portion of said fourth support arm comprises a fifth radial gear,  e) a fifth support arm having a first end portion, a second end portion, and a shank portion, wherein said second end portion of said fifth support arm comprises a sixth radial gear, wherein said third radial gear and said fifth radial gear are disposed to be in meshing contact with one another, and wherein said fourth radial gear and said sixth radial gear are disposed to be in meshing contact with one another, wherein said third support arm, said fourth support arm, and said fifth support arm collectively comprise a second substantially-linear combination, said first substantially-linear combination being disposed adjacent to said second substantially-linear combination, and wherein said first support arm and said fourth support arm are rigidly connected to one another at their shank portions, and wherein said second support arm and said fifth support arm are rigidly connected to one another at a point along their shank portions,  f) a first link arm, wherein said first link arm is pivotally connected to said fourth support arm at the shank portion of said fourth support arm, and wherein said first link arm is pivotally connected to said third support arm at the shank portion of said third support  g) a second link arm, wherein said second link arm is rigidly connected to said third support arm at the shank portion of said third support arm;

h) a third link arm, wherein said third link arm is pivotally connected to said fifth support arm at the shank portion of said fifth support arm, and wherein said third link arm is pivotally connected to said third support arm at the shank portion of said third support arm;

i) a first road surface including a side edge portion, said first road surface being attached to said first link arm;

j) a second road surface including a side edge portion, said second road surface being attached to said second link arm; and  k) a third road surface including a side edge portion, said third road surface being attached to said third link arm.

6. A flexible road surface according to claim 5, further comprising an electrical generator, wherein said generator is attached to a takeoff point disposed on said flexible road surface at any point that provides reciprocating mechanical motion, sufficiently to generate electricity upon reciprocation.

\* \* \* \* \*